United States Patent
Ragno et al.

(10) Patent No.: US 8,462,914 B2
(45) Date of Patent: Jun. 11, 2013

(54) AUTOMATED INCIDENT RESPONSE METHOD AND SYSTEM

(75) Inventors: John Ragno, Hamilton, NJ (US); Hugh Hall, Upper Montclair, NJ (US)

(73) Assignee: VitalClick LLC, Hamilton, NJ (US)

(*) Notice: Subject to any disclaimer, the term of this patent is extended or adjusted under 35 U.S.C. 154(b) by 1524 days.

(21) Appl. No.: 11/964,555

(22) Filed: Dec. 26, 2007

(65) Prior Publication Data

US 2009/0296898 A1    Dec. 3, 2009

Related U.S. Application Data

(60) Provisional application No. 60/876,506, filed on Dec. 22, 2006.

(51) Int. Cl.
*H04M 11/04*    (2006.01)

(52) U.S. Cl.
USPC .................................. 379/45; 379/266.07

(58) Field of Classification Search
USPC ............. 379/37, 45, 265.01, 265.09, 266.07, 379/266.08; 707/623
See application file for complete search history.

(56) References Cited

U.S. PATENT DOCUMENTS

| | | | | |
|---|---|---|---|---|
| 5,155,847 | A * | 10/1992 | Kirouac et al. | 709/221 |
| 5,721,914 | A * | 2/1998 | DeVries | 1/1 |
| 5,778,389 | A * | 7/1998 | Pruett et al. | 1/1 |
| 5,909,581 | A * | 6/1999 | Park | 717/170 |
| 5,974,429 | A * | 10/1999 | Strub et al. | 1/1 |
| 6,073,141 | A * | 6/2000 | Salazar | 1/1 |
| 7,515,693 | B2 * | 4/2009 | Salafia et al. | 379/45 |
| 7,788,224 | B2 * | 8/2010 | Fleck et al. | 707/623 |
| 2005/0086220 | A1 * | 4/2005 | Coker et al. | 707/4 |
| 2010/0046489 | A1 * | 2/2010 | Dickinson et al. | 370/338 |

* cited by examiner

*Primary Examiner* — Olisa Anwah
(74) *Attorney, Agent, or Firm* — Arent Fox LLP

(57) ABSTRACT

A method and system for automated incident response that includes receiving a call from a caller about an incident, such as an emergency, obtaining information from the caller about the incident, selecting one or more appropriate screens in sequence via a presentation device based on the information provided from the caller, wherein the sequence of appropriate presentations corresponds to an appropriate response to the emergency, and providing response instructions to the caller or other parties based on information presented, wherein the one or more presentations are stored in an accessible data repository.

24 Claims, 12 Drawing Sheets

Traumatic - Animal Bites

Traumatic Incident Types

- Animal Bites
- Assault/Domestic/Sexual
- Bleeding/Laceration
- Burns
- Eye Injuries
- Fall Victim
- Heat/Cold Exposure
- Industrial Accident
- Stabbing/Gun Shot Victim
- Traumatic Injury
- Vehicle Related Injuries

All Callers Interrogation

- General Questions

Miscellaneous

- Aeromedical Dispatch
- Aircraft/Terrorism
- Hazmat

Medical Chief Complaint Types

- Abdominal Pains
- Allergies/Stings
- Back Pain
- Breathing Problems
- Chest/Heart Problems
- Diabetic Problems
- Headache
- OD/Poisonings/Ingestions
- Psychiatric/Behavioral Problems
- Seizures/Convulsions
- Sick Person
- Stroke/CVA
- Unknown/Man Down

Time/Life Critical Events

- Cardiac Arrest
- CO Poisoning/Inhalation/Hazmat
- Choking
- Drowning
- Electrocution
- Pregnancy/Childbirth
- Unconscious/Fainting Navigation | English | Spanish | About

FIG.4A

Emergency Medical Dispatch

Animal Bites

KEY QUESTIONS

- Is the animal contained?
- What type of animal bit the patient?
- Is the patient short of breath or does it hurt to breathe?
- What part of the body was bitten?
- Is the patient bleeding?
  IF YES:
  - From where?
  - How much?
  - How long?
  - Can it be controlled with pressure?
- How long ago did they receive the bite?

DISPATCH

| SIMULTANEOUS ALS/BLS | BLS DISPATCH |
|---|---|
| Unconscious/not breathing normally. | Controlled bleeding. |
| Decreased level of consciousness. | Swelling at the bite site. |
| Uncontrolled bleeding, after attempts to control. | Bite below neck, non-poinsonous. |
| Serious neck or face, bites from animal attacks. | |
| Bites from known poisonous animals. | |

Pre-Arrival Instructions

Back

FIG.4B

Emergency Medical Dispatch

Assault/Domestic Violence/Sexual Assault

KEY QUESTIONS
- Is the assailant nearby?
- Are you safe?
- Was it a physical assault vs. sexual assault?
- How was the victim assaulted?
  (Stabbing, gunshot, or major trauma go to the appropriate card)
- Where is the patient injured?
- Is the patient bleeding?
- IF YES:
  - From where?
  - How much?
  - How long?
  - Can it be controlled with pressure?
- Can the patient answer your questions?

Sexual Assault - non-injured: follow County SART Protocols

Domestic Violence - non-injured: follow local Police Protocols

SIMULTANEOUS ALS/BLS DISPATCH
- Unconscious/not breathing normally.
- Decreased level of consciousness.
- Crushing injury (except to hands or feet.)
- Puncture injury (head, neck, torso, thigh.)
- Multiple extremity fractures.
- Femur (thigh) fracture.
- Uncontrolled bleeding.

BLS DISPATCH
- Penetrating/crushing injury to hands or feet.
- Isolated extremity fracture.
- Minor injuries.
- Unknown injuries.
- Concerned caller without apparent injuries to victim.
- Police request stand-by/check for injuries.

Pre-Arrival Instructions

Back

FIG.4C

Emergency Medical Dispatch

Abdominal Pain

KEY QUESTIONS

- Is patient alert?
- Is the patient breathing normally? (Consider [Breathing Card])
- Is the pain due to an injury to the patient?
- Has the patient vomited?
  - If yes: What does the vomit look like?
- Are the patient's bowel movements different than normal?
  - If yes: How would you describe them?
- Is the pain above the belly button?
- If the patient is a woman between 12-50 years, ask "Could she be pregnant?"
- Has she said she felt dizzy?
- Has there been vaginal bleeding?
  - If yes: How much?
- How does the patient act when he/she sits up?
- Does the patient have any other medical or surgical history?
- Is the patient wearing a Medic Alert Tag?
  - If yes: What does it say?

DISPATCH

SIMULTANEOUS ALS/BLS
- Unconscious/not breathing normally.
- Decreased level of consciousness.
- Vomiting blood (red/dark red) or coffee ground-like substance.
- Black tarry stool. (Caution: Could be a resultant from diet supplements)
- Lower abdominal pain, woman 12-50 years (if associated with dizziness or fainting or heavy vaginal bleeding).
- Upper abdominal pain with prior history of heart problem.
- Abdominal pain with fainting or near fainting, patient over 50 years.
- Fainting/near fainting when sitting (hypotension).

BLS DISPATCH
- Pain with vomiting.
- Flank pain (kidney stone).
- Abdominal (non-traumatic).
- Pain unspecified.

[Pre-Arrival Instructions]  [Back]

FIG.4D

Emergency Medical Dispatch

Sick Person

KEY QUESTIONS

Is patient alert?
Is patient breathing normally?
Can I talk to the patient?
  Yes: What is the problem?
    Are you short of breath or is it hard to breath?
    Are you feeling pain anywhere? If so, where? [Back] [Chest] [Abdomen]
    (Consider appropriate card)
    Do you feel light headed or dizzy?
  No: Describe what the patient is doing.
    How does the patient look?
    What is the patient complaining of?

Does the patient answer your questions?
Does the patient respond to you and follow simple commands?
Is the patient acting normally for him or her?
  If not, what is different?
Is the patient complaining of pain? Where?
How does the patient feel when he/she sits up?
Have you checked for a medic alert tag?
If there is an alert tag, what does it say?
Is there insulin in the refrigerator?
Was the onset sudden or gradual?

DISPATCH

SIMULTANEOUS ALS/BLS

Decreased level of consciousness.
Multiple fainting episodes.

BLS DISPATCH

Generalized weakness.
Medic alert from alarm company.
Flu symptoms.
High blood pressure without critical symptoms.
High temperature.
Patient assist.
Other.

[Pre-Arrival Instructions]  [Back]

Emergency Medical Dispatch

Electrocution

KEY QUESTIONS
- Is patient alert?
- Is patient breathing normally? (Consider [Breathing Card])
- If household electrocution, was it the dryer, stove, or other 220 volt source.
- Is patient still in contact with the source?
- Are there any other injuries? If so what are they?

DISPATCH

| SIMULTANEOUS ALS/BLS | BLS DISPATCH |
|---|---|
| Unconscious/not breathing normally.<br>Decreased level of consciousness.<br>Multiple Casualty Incident Criteria.<br>Reported DOA until evaluation by responsible party.<br>Burns to airway, nose, or mouth.<br>Burns over 20% of body surface.<br>Burns from 220 volt or higher source. | Household electrical shock without critical symptoms |

[Pre-Arrival Instructions]  [Back]

FIG.4G

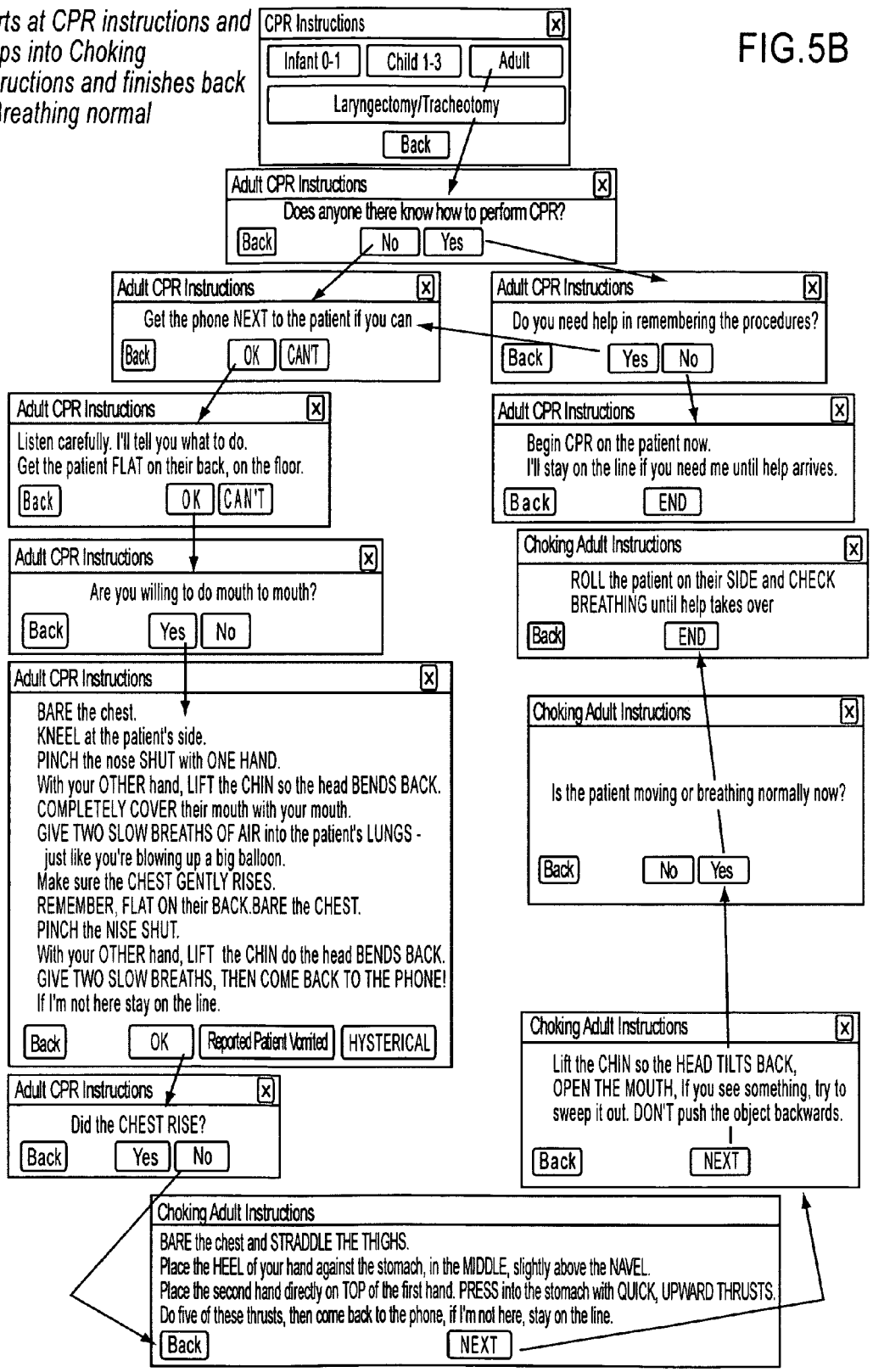

AUTOMATED INCIDENT RESPONSE METHOD AND SYSTEM

BACKGROUND OF THE INVENTION

1. Field of Invention

This invention relates to an automated emergency response method, and associated system.

2. Description of Related Art

Providers of emergency services in North America such as fire, police, and rescue departments are assisted in providing emergency services by the introduction of the 911 emergency number. In the event of a crime in progress, fire, smoke, explosion, hazardous spill, toxic leak, releases of flammable or toxic materials, acts of nature which potentially endanger the lives of humans or animals in the buildings, terrorism-related incidents, national pandemics, or the like, a typical emergency dispatch operator asks for information about the location of the caller, the type of emergency, whether anyone is injured, and miscellaneous questions related to the incident, such as name and other identifiable information for follow-up. The emergency dispatch operator may then provide a series of advice or procedure steps to the caller to help the caller. For each type of emergency, a specific set of steps are ordered to the caller to deal with the emergency, as indicated, for example, in the Emergency Medical Dispatch Guidecards of the State of New Jersey (http://www.state.nj.us/health/ems/documents/nj_emd.pdf), which is incorporated herein by reference in its entirety.

For example, the emergency dispatch operator may ask a series of questions such as "Is this a medical emergency?," "Are you having difficulty breathing?," and/or "Are you experiencing severe pain or pressure in your chest?." In general, in the related art, the emergency dispatch operator uses an emergency handbook that contains all the questions that need to be asked to respond to a particular situation. Such a handbook is typically similar to a large notebook with a number of tabs of different colors, each color corresponding to a specific type of emergency, such as the ones described above. Accordingly, during a typical emergency 911 call, the emergency dispatch operator flips back and forth through the handbook, trying to find the procedure that is most applicable to the emergency at hand. Such physical back-and-forth flip of the handbook to find the adequate portions of the handbook can be time consuming, especially since a caller is waiting to be helped out of a potentially life-threatening situation. Furthermore, the emergency dispatch operator may also pull the wrong tab on the handbook and relay instructions to the caller that are irrelevant to the emergency at hand.

During the late 1970's and early 1980's, Emergency Medical Dispatch (EMD) protocols were developed to provide the dispatcher with medically sound and clinically based direction. The American Society For Testing and Materials (ASTM) and the National Association of Emergency Medical Services Physicians (NAEMSP) developed national voluntary practice standards for EMD.

The National Highway Traffic Safety Administration (NHTSA) used those voluntary practice standards to develop the: EMERGENCY MEDICAL DISPATCH: NATIONAL STANDARD CURRICULUM. [National Curriculum]. A standard set of questioning protocols were designed to guide the emergency medical dispatcher in proper caller questioning technique. These questioning protocols were called Emergency Medical Dispatch Protocol Reference System [EMPDPRS]. One such system is the Emergency Medical Dispatch Guidecards mentioned above. The EMPDRS allows the dispatcher to consistently and accurately:

identify the level of need,
identify situations that require pre-arrival instructions,
gather information that should be relayed to responding personnel and,
gather scene safety information in the same manner every time.

In cases of serious medical emergencies, the Dispatcher is a true "first responder" by providing early treatment prior to the arrival of dispatched medical resources.

The National Standard Curriculum requires an EMDPRS to adhere to all known standards; local, national, ASTM, NAEMSP and other professional organizations. Some of the key MINIMUM requirements of an EMDPRS:

a "written" system of "cards" that can be used by the EMD;
EMDs need a written, consistent protocol.

EMDs need to have a protocol that they can have, on hand, to read to callers. This can be a hard copy. The protocols need to be written consistently in terms of structure, reading level, fonts, etc. The protocols must be color coded as established by NHTSA.

Specific training must be given to all operators. This training is established and standardized as set forth in the EMD Instructors Guide developed by NHTSA found at http://www.nhtsa.dot.gov/people/injury/ems/EMDMngrsGuide/EMDDManagersGuide1stpart.pdf and http://www.nhtsa.dot.gov/peopl/injury/ems/EMDMngrsGuide/EMD--Manager's%20Guide--Appendix.pdf. These Guides are incorporated herein by reference in their entirety.

Changes in protocols should be made when it is determined to be in the best interest of the system and an improvement in protocol accuracy, specificity and patient care issues. Changes are also made when new information becomes available that protocols out-of-date when compared to current medical science. These changes are difficult to implement country wide in a hard copy card system or even in standalone computer duplications of a card system.

In cases of emergency, time is critical to the survival of the person experiencing the emergency. Therefore, among other things, a suitable method to increase operator efficiency and reduce processing time of the emergency call is necessary to increase the chances of survival of the person experiencing the emergency.

Another difficulty in a "card" system is the chance of error in a question posing situation such as the one shown in FIG. 5A. This is an example of a guidecard used when the operator is asking the questions of the caller. As is apparent, it is impossible to put all questions on a single card. The operator must flip between cards. As long as the situation flows smoothly, the operator stays in the normal sequence of the cards. However, if the caller answers "no" to the question of "Did the chest rise?", then the operator must quickly flip to the appropriate cards for adult choking, in this example, and not the cards for infant choking or child choking.

SUMMARY OF THE INVENTION

In light of the above described problems and shortcomings, as well as others, various exemplary embodiments of the methods according to this invention provide a method of automated incident response, such as responding to an emergency call received, obtaining information from the caller as to the type of incident, selecting one or more appropriate presentations of a set of instructions to deal with the incident, determining whether the correct presentation has been selected, and relaying instructions provided in the presentation to the caller in order to deal with the incident.

Various exemplary embodiments of the systems of this invention also provide a system of automated incident response that includes features for providing a dispatch operator with instructions pertaining to the specific incident in an efficient manner, wherein the operator selects, for example, on a graphic user interface (GUI) screen or other display one or more icons or tabs that correspond to the nature of the incident of the caller, and a series of incident response procedures adapted to a number of possible incident calls are stored.

These and other features and advantages of this invention are described in, or are apparent from, the following detailed description of various exemplary embodiments of the systems and methods according to this invention.

BRIEF DESCRIPTION OF THE DRAWINGS

Various exemplary embodiments of the systems and methods will be described in detail, with reference to the following figures, wherein:

Figure 4F:
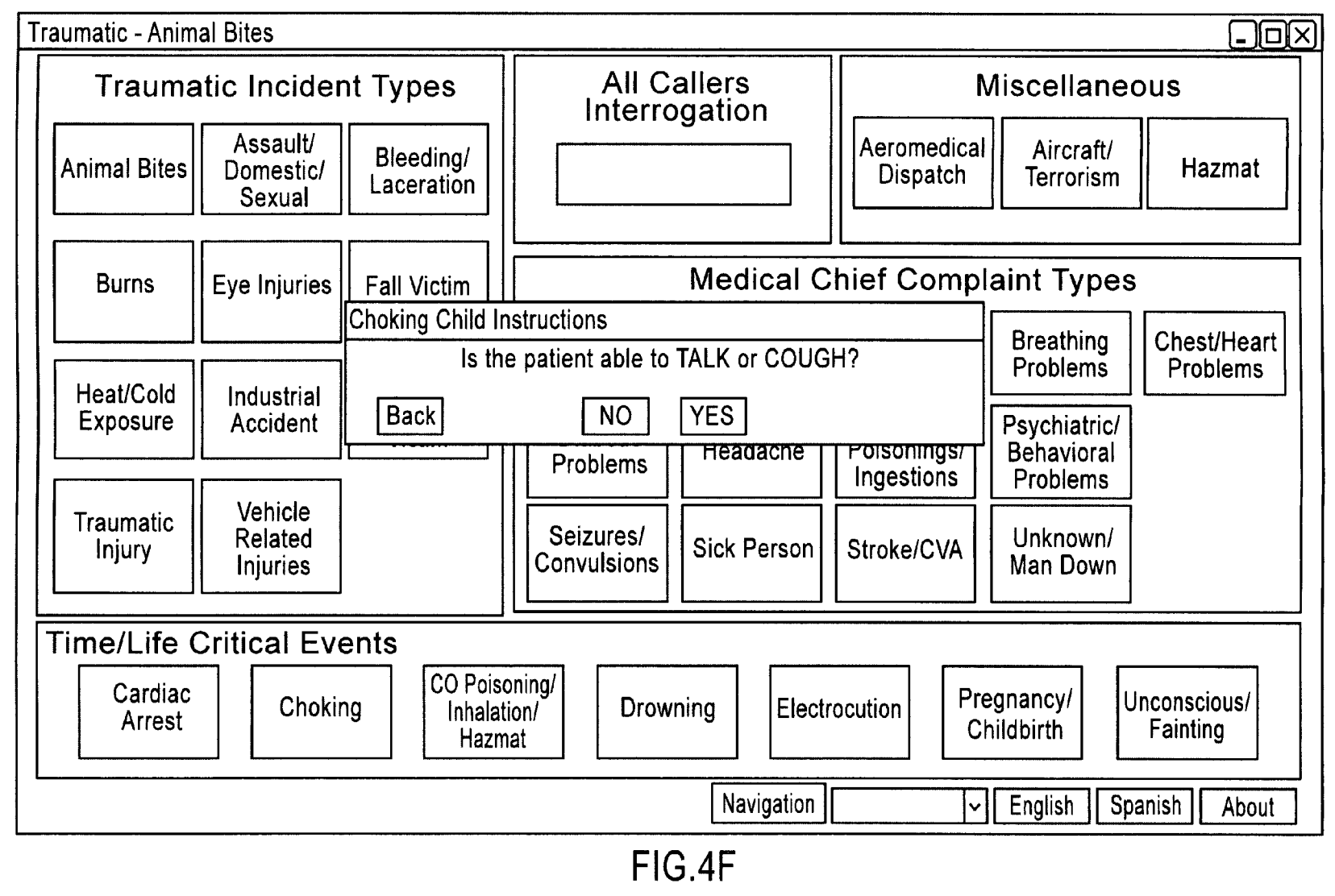

FIGS. 4A-4G are representations of various GUI screens from example emergency response scenarios, according to an exemplary embodiments of this invention;

FIG. 5B is an example of part of an embodiment of the present invention showing the looping nature of the system where by clicking on the appropriate answer buttons, the user is guided though the necessary question screens to handle the problem in real time with having to search and find the appropriate card, in order to have the correct questions to ask.

DETAILED DESCRIPTION OF PREFERRED EMBODIMENTS

Figure 1:
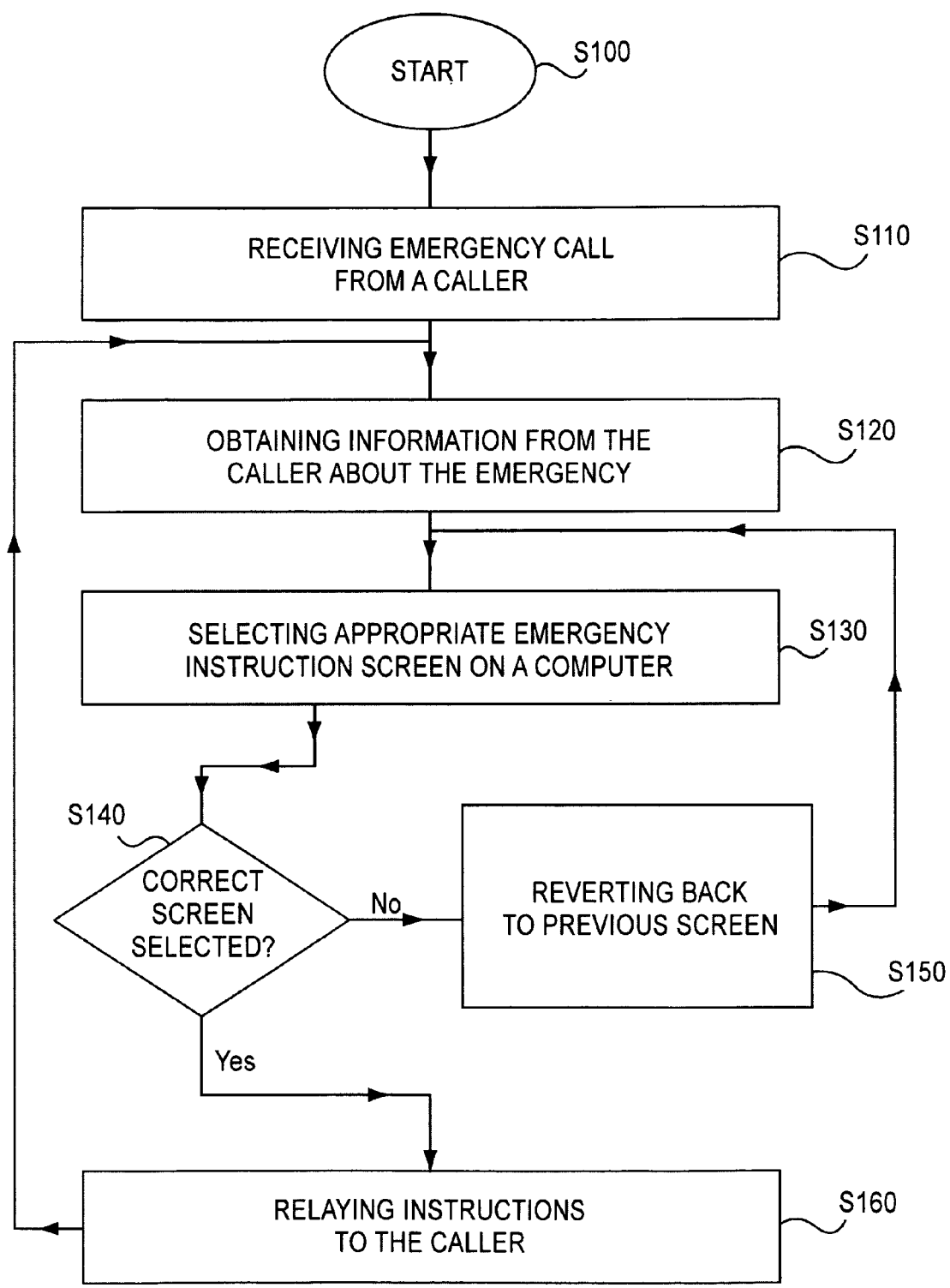
FIG. 1 is a flowchart illustrating an exemplary method of providing incident response in accordance with embodiments of the present invention.

FIG. 1 is a flowchart illustrating an exemplary method of automated incident response. In FIG. 1, the method starts at step S100 and continues to step S110, where a user, such as a 911 operator, receives a communication from a caller such as via a telephone call. The call may be an emergency call. Next, control continues to step S120, where, in case the call is an emergency call, the user obtains information from the caller about the emergency. For example, the user may ask the question "Are you having difficulty breathing?" or "Is there an intruder in your house?" Next, control continues to step S130.

At step S130, on the basis of the information received by the user from the caller, the user may select features such as on a computer screen or other presentational selection mechanism, one or more icons or tabs or other selection that correspond to the specific emergency referred to by the caller. For example, a display for the user may contain a plurality of icons of different colors, each color corresponding to a specific type of emergency and relating to emergency response scenarios, such as medical complaints, traumatic complaints, crime complaints, and the like. Similarly, non-display features may be used, such as sound based selections (e.g., interactive voice response). On the basis of the emergency selected and the instructions of the emergency response scenario presented to the user, the user may also determine whether to send, for example, an ambulance to the location of the caller and/or indicate the need for basic life support. Next, control continues to step S140, which is a safety control step, where a determination is made whether the correct screen or other presentation has been selected, such as by clicking or otherwise selecting the correct icon or tab on the previous screen. A correct presentation is selected when the emergency response scenario presentation corresponds to the emergency of the caller. If the presentation does not correspond to the emergency of the caller, then control continues to step S150, where the user reverts back to the previous presentation (e.g., display screen). In the case where the current presentation is the first presentation selected by the user, then during step S150, the user reverts to the previous presentation, which, for example may be the first screen displayed on a display system.

Following step S150, once the previous presentation has been selected to correct the error, control continues to step S130 in order to select a presentation that actually corresponds to the emergency at hand, on the basis of the information provided by the caller. Furthermore, the various presentations may be designed to appear sequentially, and moving to one presentation to the next may, for example, only be accomplished by answering "yes" or "no" to questions prompting the user, in order to avoid accidentally selecting the wrong emergency response scenario by, for example, clicking on the wrong icon or tab. In other words, if the user selects the icon or tab corresponding to, for example, "intruder," the user can no longer see icons or tabs corresponding to, for example, "poisoning" on the computer screen, and can only navigate within the "intruder" emergency response scenario set of screens and instructions. Alternatively, the user may have the option of navigating from one icon or tab to the next, each tab representing different types of emergencies, because a portion of the computer screen, for example, may display all the icons, possibly each icon having a different color or other distinguishing characteristic, even if the user is dealing with a single emergency.

If, during step S140, the selected presentation is correct, such as a screen that corresponds to the actual emergency of the caller, then control continues to step S160, where any information or instructions provided in the presentation are relayed back to the caller by the user in order to deal with the emergency. For example, the user may read instructions off of the computer screen and tell the caller to "place your hands on the person's chest" or "push five times on his chest then perform CPR." Once the instructions presentations are provided to the caller, control continues to step S120, where more information may be obtained from the caller. For example, such information may be a response to the question "Is his chest rising?" Depending on the answer to this question, control continues to step S130, where another screen is selected in order to assist the caller.

Furthermore, additional instructions may be presented while the user is giving instructions to the caller. For example, while the user is instructing the caller to perform CPR on a person suffering from a heart attack, the presentation may provide a question such as "Did the person's chest rise?", which may be used in order to determine whether to continue CPR or to perform another procedure. Such an instruction, which may be part of the procedure of response to a heart attack stored in a data repository, for example, may be scheduled to be presented a certain time after the instruction to perform CPR is provided to the caller.

Figure 5A:
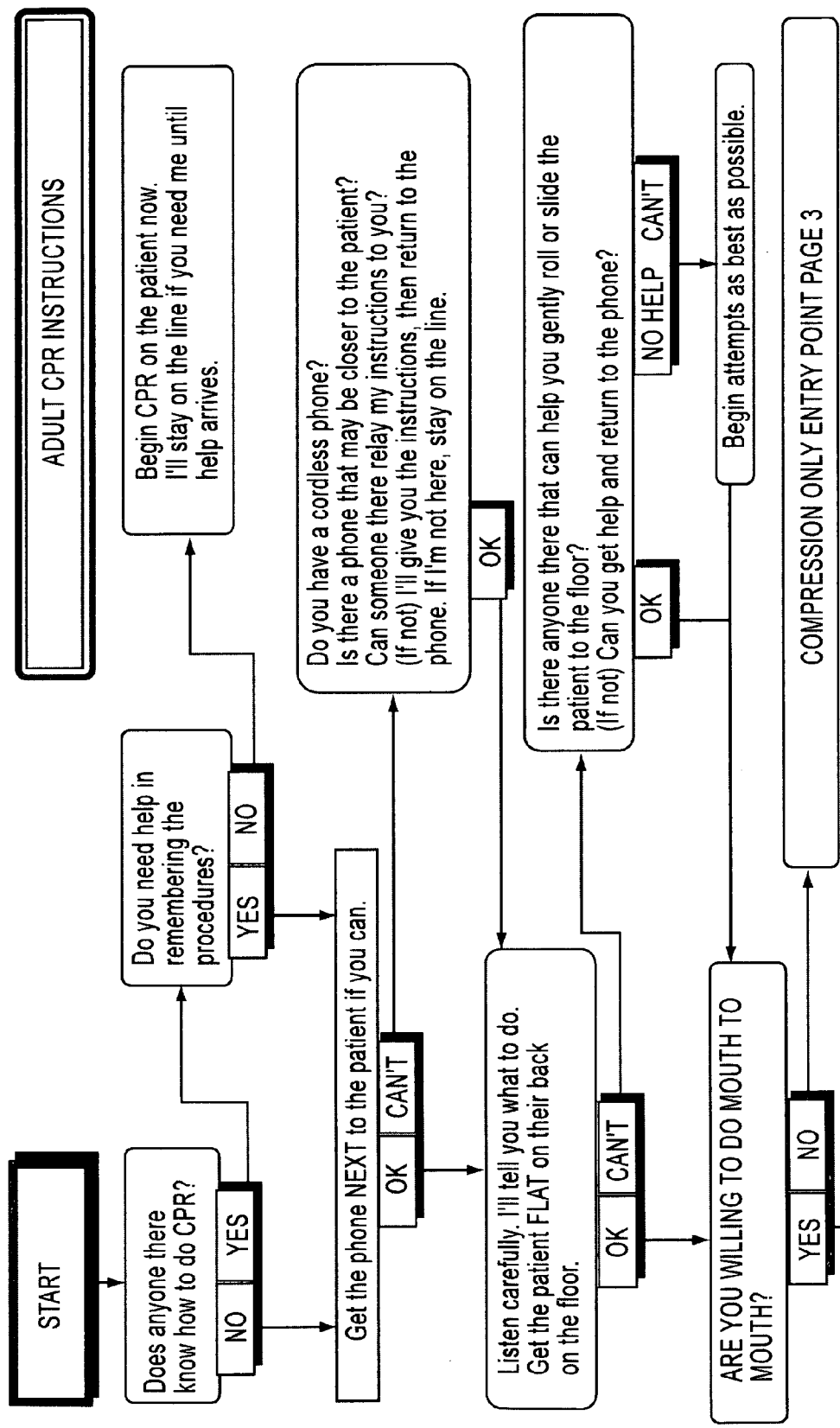
FIG. 5A is an example of a present day guide card for Adult CPR instruction questions.

As can be seen in FIG. 5B, the looping ability of the present invention enables an user to switch automatically from the CPR instructions for an Adult to the Choking instructions depending upon the situation and the answers from the caller. The problem of finding the "right" card both with respect to the real time details of the situation and the age of the patient are avoided. This keeps the caller and the user locked into a controlled question and answer protocol that insures that the patient receives the best possible help that is available. There is no mis-direction.

Thus, a series of emergency response scenarios and related procedures may be put in place, stored in memory, and provided to the user for an emergency call. The procedures may be similar to those of traditional 911 calls such as medical or crime emergencies, and may also include other emergencies, such as protocols for dealing with a terrorist attack, a dirty bomb, a chemical or biological attack, or any other type of emergencies whether or not yet known. Examples of GUI's or screens displayed to the user are provided in FIGS. 4A-4G.

Figure 2:
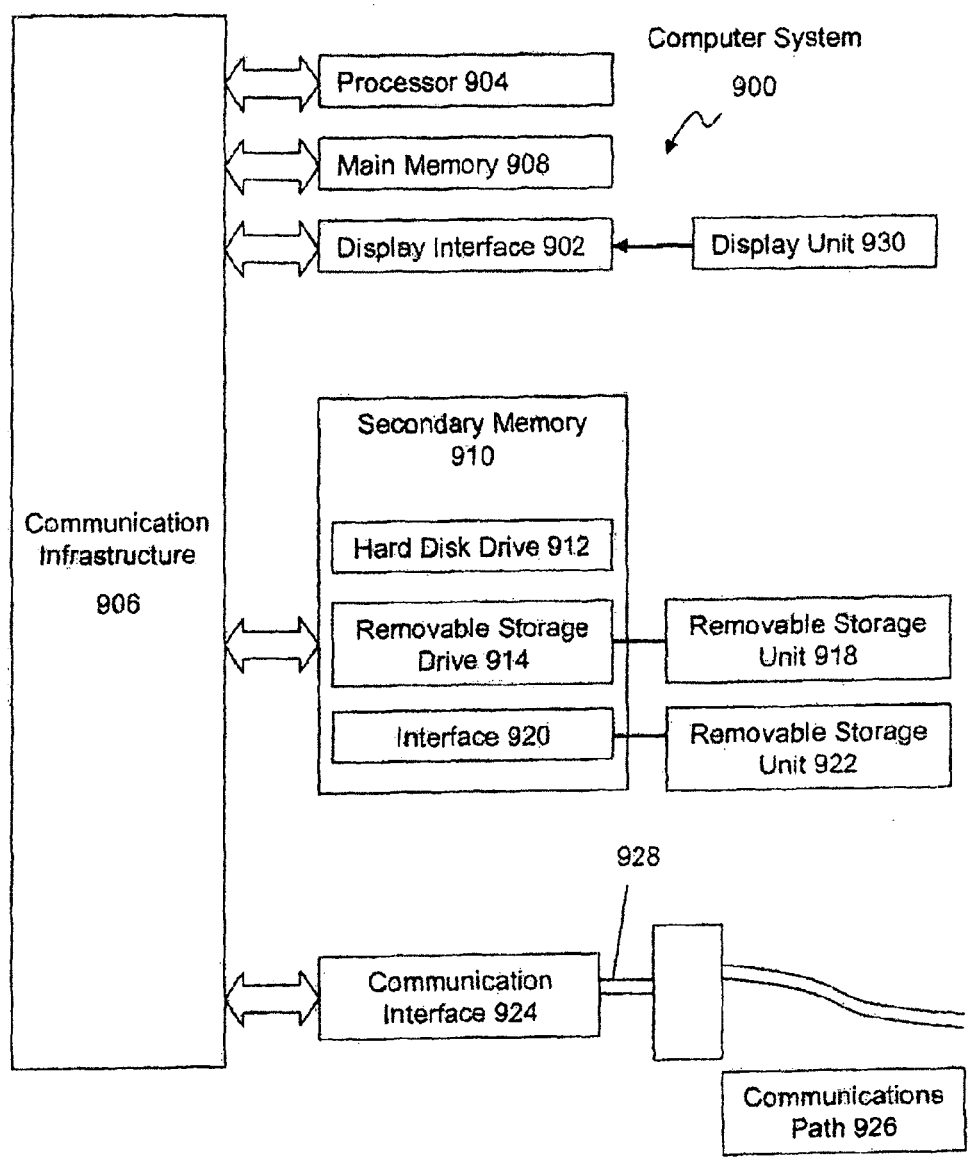
FIG. 2 presents an exemplary system diagram of various hardware components and other features, for use in accordance with an embodiment of the present invention.

The present invention may be implemented using hardware, software, or a combination thereof and may be implemented in one or more computer systems or other processing systems. In one embodiment, the invention is directed toward one or more computer systems capable of carrying out the functionality described herein. An example of such a computer system 900 is shown in FIG. 2.

Computer system 900 includes one or more processors, such as processor 904. The processor 904 is connected to a communication infrastructure 906 (e.g., a communications bus, cross-over bar, or network). Various software embodiments are described in terms of this exemplary computer system. After reading this description, it will become apparent to a person skilled in the relevant art(s) how to implement the invention using other computer systems and/or architectures.

Computer system 900 can include a display interface 902 that forwards graphics, text, and other data from the communication infrastructure 906 (or from a frame buffer not shown) for display on a display unit 930. Computer system 900 also includes a main memory 908, preferably random access memory (RAM), and may also include a secondary memory 910. The secondary memory 910 may include, for example, a hard disk drive 912 and/or a removable storage drive 914, representing a floppy disk drive, a magnetic tape drive, an optical disk drive, etc. The removable storage drive 914 reads from and/or writes to a removable storage unit 918 in a well-known manner. Removable storage unit 918, represents a floppy disk, magnetic tape, optical disk, etc., which is read by and written to removable storage drive 914. As will be appreciated, the removable storage unit 918 includes a computer usable storage medium having stored therein computer software and/or data.

In alternative embodiments, secondary memory 910 may include other similar devices for allowing computer programs or other instructions to be loaded into computer system 900. Such devices may include, for example, a removable storage unit 922 and an interface 920. Examples of such may include a program cartridge and cartridge interface (such as that found in video game devices), a removable memory chip (such as an erasable programmable read only memory (EPROM), or programmable read only memory (PROM)) and associated socket, and other removable storage units 922 and interfaces 920, which allow software and data to be transferred from the removable storage unit 922 to computer system 900.

Computer system 900 may also include a communications interface 924. Communications interface 924 allows software and data to be transferred between computer system 900 and external devices. Examples of communications interface 924 may include a modem, a network interface (such as an Ethernet card), a communications port, a Personal Computer Memory Card International Association (PCMCIA) slot and card, etc. Software and data transferred via communications interface 924 are in the form of signals 928, which may be electronic, electromagnetic, optical or other signals capable of being received by communications interface 924. These signals 928 are provided to communications interface 924 via a communications path (e.g., channel) 926. This path 926 carries signals 928 and may be implemented using wire or cable, fiber optics, a telephone line, a cellular link, a radio frequency (RF) link and/or other communications channels. In this document, the terms "computer program medium" and "computer usable medium" are used to refer generally to media such as a removable storage drive 980, a hard disk installed in hard disk drive 970, and signals 928. These computer program products provide software to the computer system 900. The invention is directed to such computer program products.

Computer programs (also referred to as computer control logic) are stored in main memory 908 and/or secondary memory 910. Computer programs may also be received via communications interface 924. Such computer programs, when executed, enable the computer system 900 to perform the features of the present invention, as discussed herein. In particular, the computer programs, when executed, enable the processor 910 to perform the features of the present invention. Accordingly, such computer programs represent controllers of the computer system 900.

In an embodiment where the invention is implemented using software, the software may be stored in a computer program product and loaded into computer system 900 using removable storage drive 914, hard drive 912, or communications interface 920. The control logic (software), when executed by the processor 904, causes the processor 904 to perform the functions of the invention as described herein. In another embodiment, the invention is implemented primarily in hardware using, for example, hardware components, such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

Figure 3:
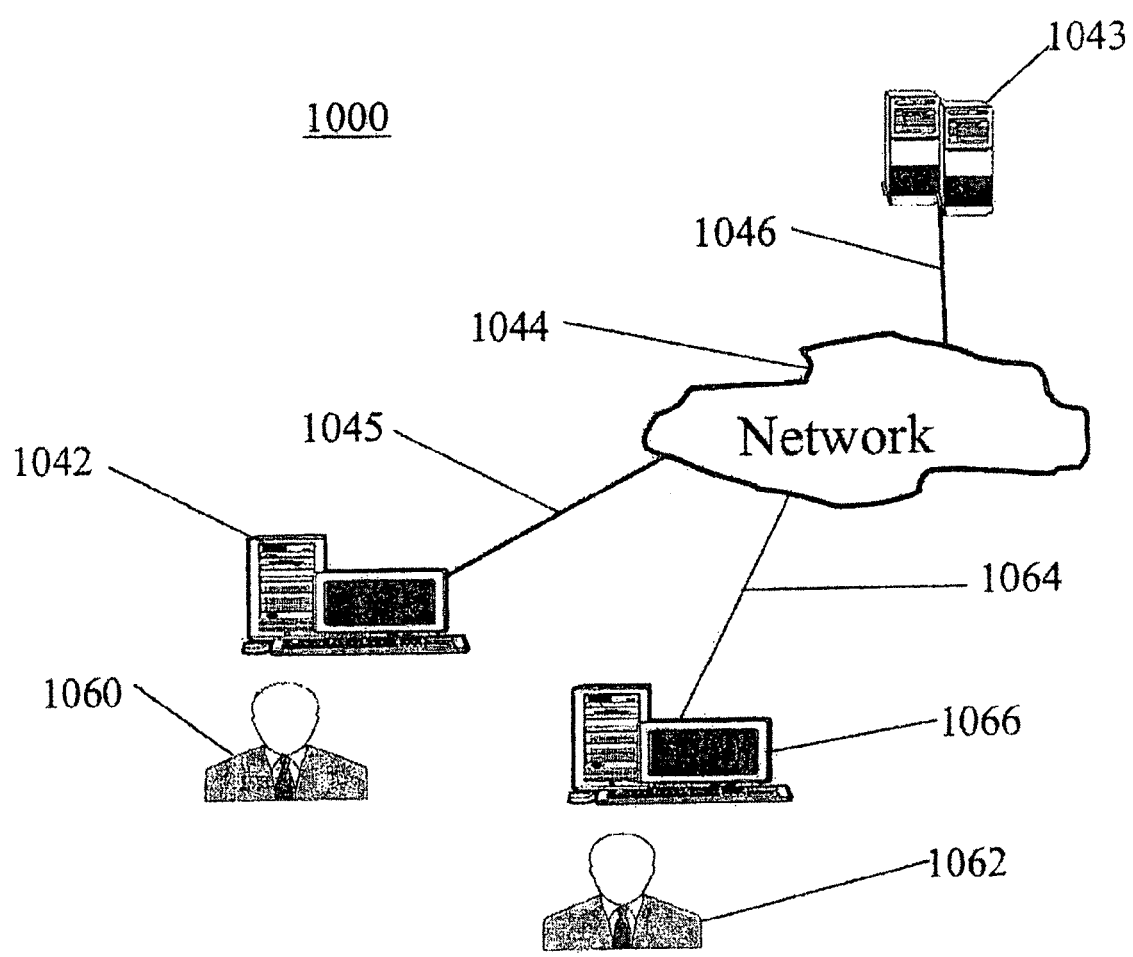
FIG. 3 is a block diagram of various exemplary system components, in accordance with an embodiment of the present invention.

FIG. 3 shows a communication system 1000 usable in accordance with the present invention. The communication system 1000 includes one or more accessors 1060, 1062 (also referred to interchangeably herein as one or more "users") and one or more terminals 1042, 1066. In one embodiment, data for use in accordance with the present invention is, for example, input and/or accessed by accessors 1060, 1064 via terminals 1042, 1066, such as personal computers (PCs), minicomputers, mainframe computers, microcomputers, telephonic devices, or wireless devices, such as personal digital assistants ("PDAs") or a hand-held wireless devices coupled to a server 1043, such as a PC, minicomputer, mainframe computer, microcomputer, or other device having a processor and a repository for data and/or connection to a repository for data, via, for example, a network 1044, such as the Internet or an intranet, and couplings 1045, 1046, 1064. The couplings 1045, 1046, 1064 include, for example, wired, wireless, or fiberoptic links. In another embodiment, the method and system of the present invention operate in a stand-alone environment such as on a single terminal.

The invention is currently implemented fully in accordance with the NHTSA EMD standards for protocols and for color schemes. While the invention currently complies with NHTSA EMD standards, it can be made or implemented to comply with whatever standards/criteria/protocols that are needed or desired. In addition, the invention has the advantage of being able to be instantly updated uniformly when the standards are changed with little or no impact on the environment. It is impossible for "cards" to be misplaced or lost. User stress is reduced since the back-button, automatic looping navigation, overall computer functionality leaves the user focus on the situation at hand and not what they are physically doing. Since there is no maintenance of the "cards", user and EMS agency liability is reduced since there are no physical cards to be updated, etc. The presentation of the protocols and questions are automatically logical and in the necessary structured sequence. There is no possibility of getting "cards" out of order.

Additionally, the system can be implemented in languages other than English, for example, in Spanish. This uniquely enables a user who may be fluent in the other language to operate solely in that language with the best possible translation of the questions, rather than an ad hoc translation by the user from English while under the stress of the situation. The system can be readily switched on demand depending solely on the caller and the needs of the situation.

Furthermore, while this invention has been described in conjunction with the exemplary embodiments outlined above, various alternatives, modifications, variations, improvements, and/or substantial equivalents, whether known or that are or may be presently unforeseen, may become apparent to those having at least ordinary skill in the art. Accordingly, the exemplary embodiments of the invention, as set forth above, are intended to be illustrative, not limiting. Various changes may be made without departing from the spirit and scope of the invention. Therefore, the invention is intended to embrace all known or later-developed alternatives, modifications, variations, improvements, and/or substantial equivalents.

What is claimed is:

1. A method for providing automated incident response information, comprising:
   receiving a call from a caller about an incident;
   obtaining information from the caller about the incident;
   selecting one or more presentations from a display of presentations in sequence based on the information provided from the caller, wherein the sequence of displayed presentations corresponds to an appropriate response protocol to the incident; and
   providing incident response instructions based on information provided in the presentations;
   wherein the one or more presentations are stored in an accessible data repository; and
   wherein the appropriate response protocol is provided by a response protocol source and is instantly updated when the response protocol source is updated.

2. The method of claim 1, wherein the call from the caller is received by a user.

3. The method of claim 2, wherein if the user selects a presentation that is not an appropriate presentation, then the user selects another presentation.

4. The method of claim 1, wherein selecting one or more appropriate presentations comprises:
   selecting one or more selections in sequence on the one or more appropriate presentations that correspond to the incident; wherein the sequence of selections corresponds to the appropriate response to the incident.

5. The method of claim 1, further comprising:
   dispatching emergency help to the caller.

6. The method of claim 5, wherein the incident help is at least one of a dispatched ambulance, a dispatched fire emergency crew, and dispatched police.

7. The method of claim 1, wherein the sequence of appropriate presentations is a sequence that leads to a best resolution of the incident situation.

8. The method of claim 1, wherein the incident response instructions include first and second instructions, wherein the second instructions are provided depending on the received response to the first instructions.

9. The method of claim 2, wherein the one or more appropriate presentations include instructions to the user and questions to the caller.

10. The method of claim 1, wherein the one or more appropriate presentations include questions to the caller.

11. An automated emergency response system, comprising:
    a controller;
    a data repository accessible by the controller, the data repository storing a plurality of presentations or information that correspond to a plurality of incidents, the plurality of presentations and the information being provided from a response protocol source and being instantly updated when the response protocol source is updated;
    a presentation device coupled to the controller, the presentation device presenting data obtained from the data repository in a display of the presentations;
    wherein, the plurality of displayed presentations are accessible via the controller and can be presented on the basis of one or more of the incident situations.

12. A system for automated emergency response, the system comprising:
    means for receiving a call from a caller about an emergency;
    means for obtaining information from the caller about the emergency;
    means for selecting one or more appropriate screens from a display of presentations in sequence on a computer display based on the information provided from the caller, wherein the sequence of displayed appropriate screens corresponds to an appropriate response protocol to the emergency; and
    means for providing emergency response instructions to the caller based on information displayed on the one or more appropriate screens;
    wherein the one or more appropriate screens are stored in an accessible data repository; and
    wherein the appropriate response protocol is provided by a response protocol source and is instantly updated when the response protocol source is updated.

13. A system for automated emergency response, the system comprising:
    a processor;
    a user interface functioning via the processor; and
    a repository accessible by the processor;
    wherein, a call is received from a caller about an emergency;
    wherein, information about the emergency is obtained from the caller, the information being provided from a response protocol source and being instantly updated when the response protocol source is updated;

wherein, one or more appropriate screens are selected from a display of presentations in sequence on a computer display based on the information provided from the caller, wherein the sequence of displayed appropriate screens corresponds to an appropriate response to the emergency;

wherein emergency response instructions are provided to the caller based on information displayed on the one or more appropriate screens; and wherein the one or more appropriate screens are stored in an accessible data repository.

14. The system of claim 13, wherein the processor is housed on a terminal.

15. The system of claim 14, wherein the terminal is selected from a group consisting of a personal computer, a minicomputer, a main frame computer, a microcomputer, a hand held device, and a telephonic device.

16. The system of claim 13, wherein the processor is housed on a server.

17. The system of claim 16, wherein the server is selected from a group consisting of a personal computer, a minicomputer, a microcomputer, and a main frame computer.

18. The system of claim 16, wherein the server is coupled to a network.

19. The system of claim 18, wherein the network is the Internet.

20. The system of claim 18, wherein the server is coupled to the network via a coupling.

21. The system of claim 20, wherein the coupling is selected from a group consisting of a wired connection, a wireless connection, and a fiberoptic connection.

22. The system of claim 13, wherein the repository is housed on a server.

23. The system of claim 22, wherein the server is coupled to a network.

24. A non-transitory computer program product comprising a computer usable medium having control logic stored therein for causing a computer to perform an automated emergency response, the control logic comprising:

first computer readable program code means for receiving a call from a caller about an emergency;

second computer readable program code means for obtaining information from the caller about the emergency;

third computer readable program code means for selecting one or more appropriate screens from a display of presentations in sequence on a computer display based on the information provided from the caller, wherein the sequence of displayed appropriate screens corresponds to an appropriate response protocol to the emergency; and fourth computer readable program code means for providing emergency response instructions to the caller based on information displayed on the one or more appropriate screens;

wherein the one or more appropriate screens are stored in an accessible data repository; and wherein the appropriate response protocol is provided by a response protocol source and is instantly updated when the response protocol source is updated.

\* \* \* \* \*